United States Patent [19]

Reicks

[11] 4,009,557
[45] Mar. 1, 1977

[54] SOYBEAN HARVESTER

[75] Inventor: Allen V. Reicks, East Moline, Ill.

[73] Assignee: Iowa State University Research Foundation, Inc., Ames, Iowa

[22] Filed: May 16, 1975

[21] Appl. No.: 578,274

[52] U.S. Cl. .................................... 56/98; 56/14.3
[51] Int. Cl.$^2$ ....................................... A01D 45/02
[58] Field of Search ............ 56/98, 13.9, 106, 111, 56/119, 14.3; 171/61, 62, 38

[56] References Cited

UNITED STATES PATENTS

| 2,606,416 | 8/1952 | Bruner | 56/327 R |
| 2,855,058 | 10/1958 | Krier et al. | 171/38 X |
| 3,201,928 | 8/1965 | Claas | 56/98 |
| 3,808,783 | 5/1974 | Sutherland et al. | 56/106 |
| 3,812,661 | 5/1974 | Baker | 56/14.4 |
| 3,911,651 | 10/1975 | Schreiber | 56/98 |

Primary Examiner—Russell R. Kinsey
Attorney, Agent, or Firm—Rudolph L. Lowell

[57] ABSTRACT

A conventional self-propelled combine has a forwardly positioned platform assembly equipped with a usual transverse auger for conveying cut crop plants to a crop intake which is located in the platform assembly back wall intermediate the ends of the auger. A row crop header mounted from the floor of the platform assembly is comprised of a plurality of transversely spaced harvesting or row units, each of which includes a pair of gathering belts arranged at opposite sides of a longitudinally extended guideway. A pair of discs having upwardly and outwardly inclined peripheral notched sections are positioned transversely opposite each other at the forward end of the guideway. The adjacent peripheral portions of the discs are in an overlapped relation so that the peripheral section of the lowermost disc in the cutting zone of the discs rests on the ground surface. Each row unit is movably supported on the floor of the platform assembly for up and down pivotal movement of the forward end thereof so that the lowermost disc floats on the ground surface to provide for a crop plant to be cut closely adjacent the ground surface. Additionally, each row unit is laterally movable to provide for the centering of a crop plant in a row in the cutting zone of the discs.

2 Claims, 13 Drawing Figures

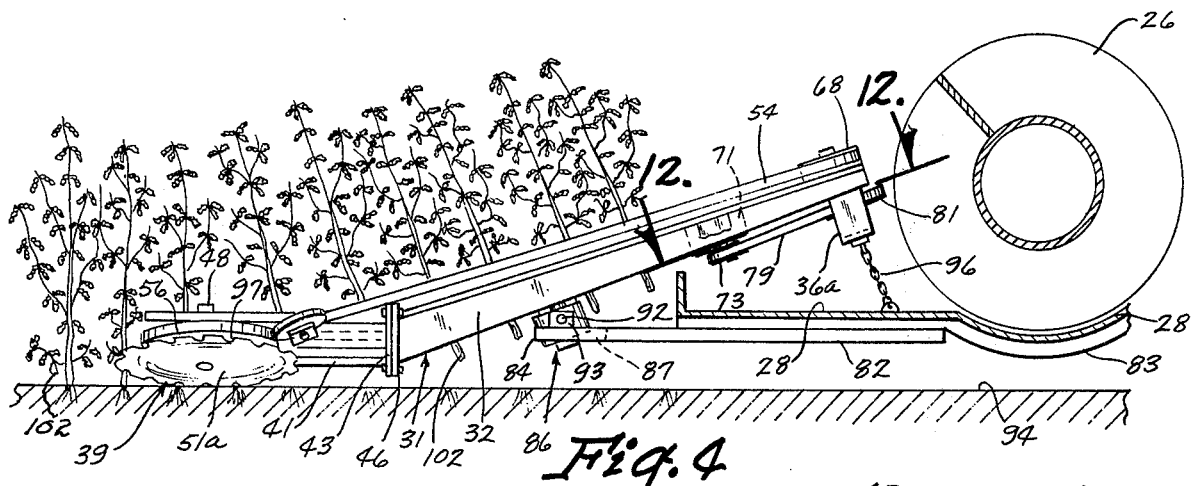
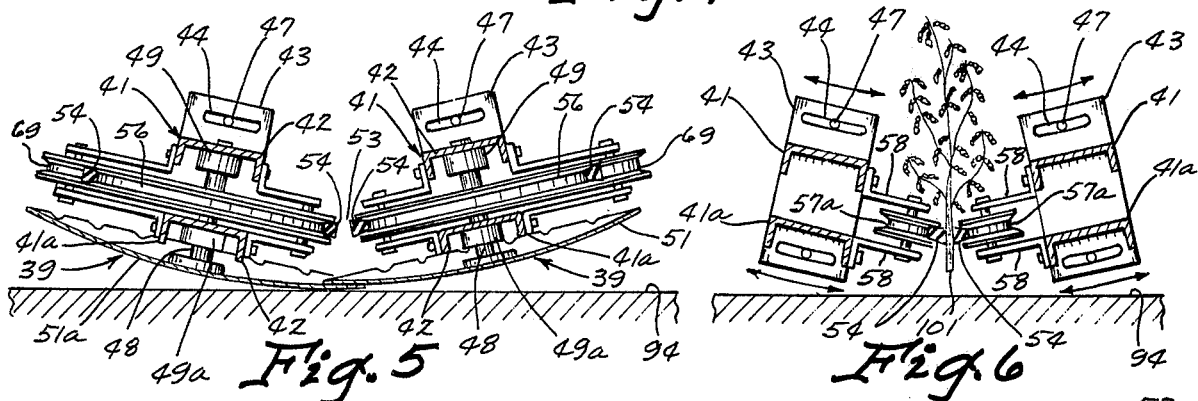
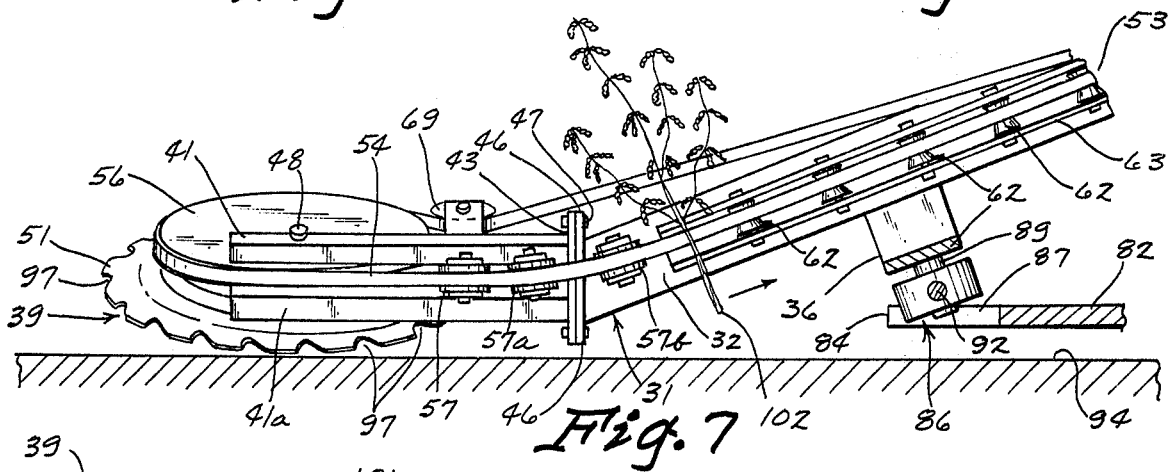
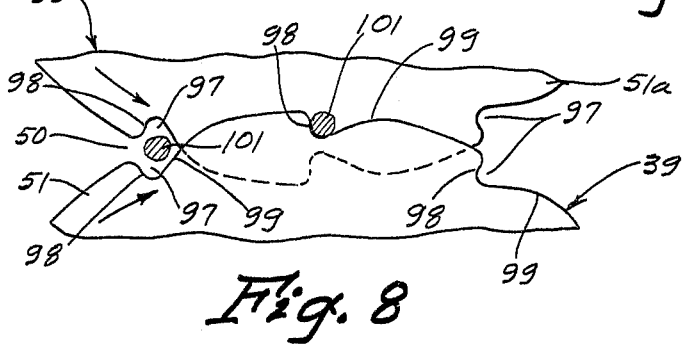

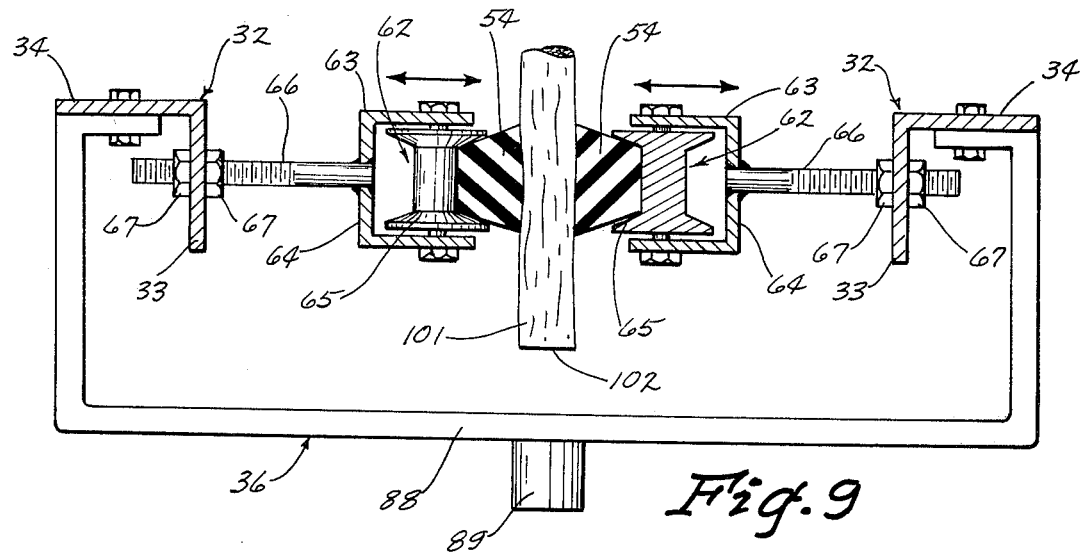
Fig. 9
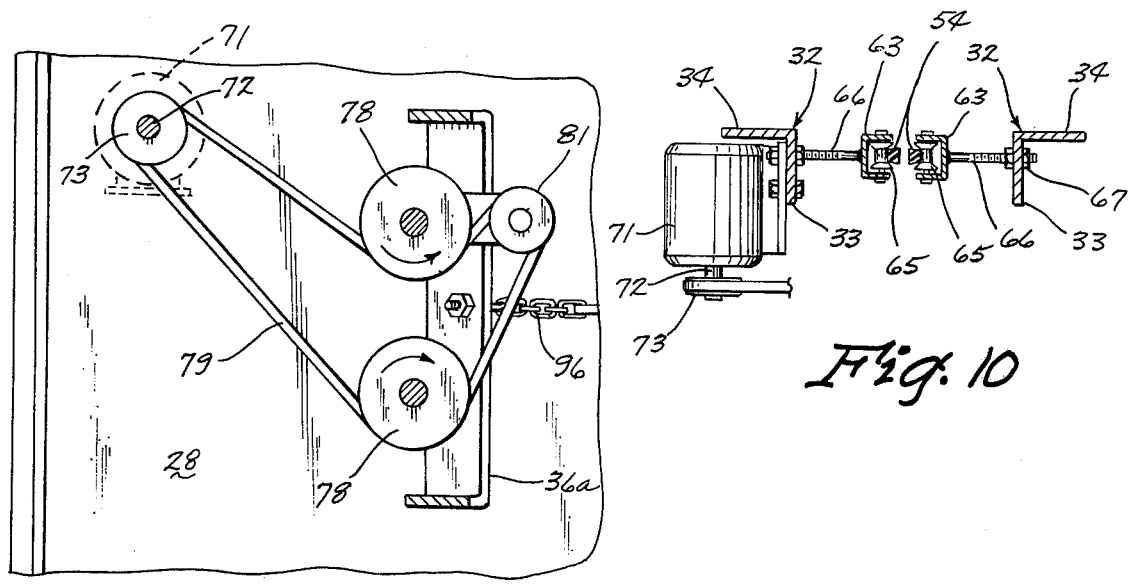
Fig. 12
Fig. 10
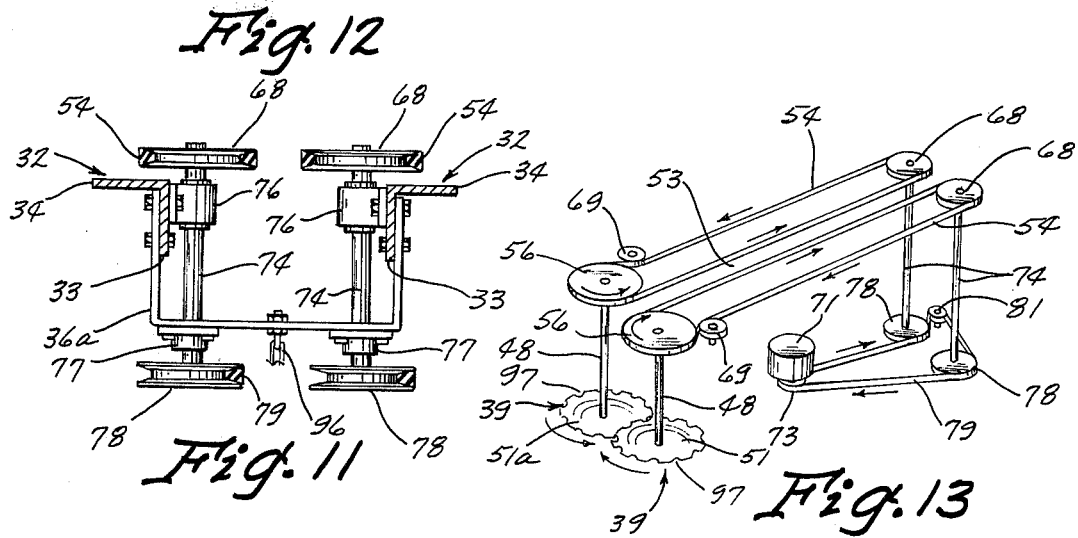
Fig. 11
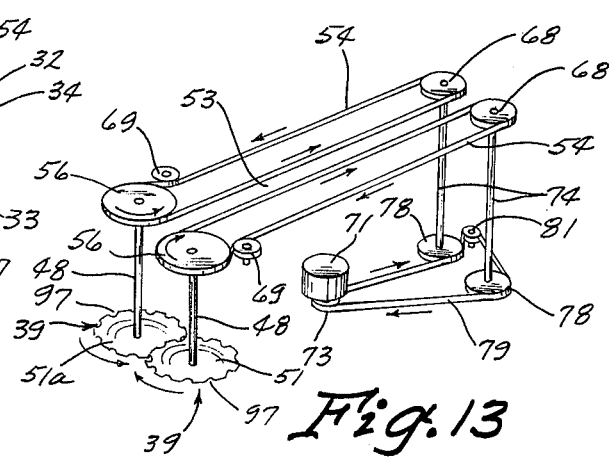
Fig. 13

SOYBEAN HARVESTER

SUMMARY OF THE INVENTION

The invention provides an improved soybean harvesting machine that is efficient in operation to separately cut and remove plants from a row with a minimum of harvest loss. The row units are independently supported on the machine for a pivotal up and down floating action of the front ends thereof separately from or cojointly with movement of such front ends laterally of a row to centered cutting positions relative to a plant in a row. The upturned peripheral sections of the cutting discs provide for a relative adjustment of each pair of discs to positions wherein such peripheral sections are in an overlapping relation in the cutting zone of the discs. Notches in the disc peripheral sections are of a size to receive a plant stalk therein so that the discs function to laterally move a row unit to center a plant in the cutting zone of the discs. With the front end of a harvesting unit having a floating action relative to the ground surface, the lowermost disc in each pair of cutting discs is in riding engagement on the ground surface. A plant in a row is thus severed at substantially ground level and below all of the bean pods on a plant concurrently with being gripped between yieldable gathering belts so that shatter and stubble losses are reduced to a minimum. The cutting discs thus function not only to sever a plant adjacent the ground, but also floatingly support a row unit and guide a row unit in a following centered relation with the plants in a row.

BRIEF DESCRIPTION OF THE DRAWINGS

FIG. 4 is a longitudinal sectional view taken on line 4—4 in FIG. 2 and showing a row unit according to the invention;

FIG. 5 is a transverse sectional view taken on line 5—5 in FIG. 2 and showing the lateral arrangement of the gathering belts and cutting discs;

FIG. 6 is a transverse sectional view taken on line 6—6 in FIG. 2 showing the means for adjusting the disc support shafts;

FIG. 7 is an enlarged longitudinal sectional view showing the bearing assembly about which the row unit is laterally pivotable;

FIG. 8 is an enlarged detail view of the disc cutting zone illustrating the travel of a plant stem therethrough;

FIG. 9 is an enlarged transverse sectional view on line 9—9 in FIG. 2;

FIG. 10 is a transverse sectional view taken on line 10—10 in FIG. 2 showing the hydraulic motor drive for the gathering belts and cutting discs of a row unit;

FIG. 11 is a transverse sectional view taken on line 11—11 in FIG. 2 showing the drive system for the gathering belts;

FIG. 12 is a sectional view as seen along line 12—12 in FIG. 4; and

FIG. 13 is a diagrammatic showing of the power transmission system of a row unit.

DETAILED DESCRIPTION OF THE INVENTION

Figure 1:
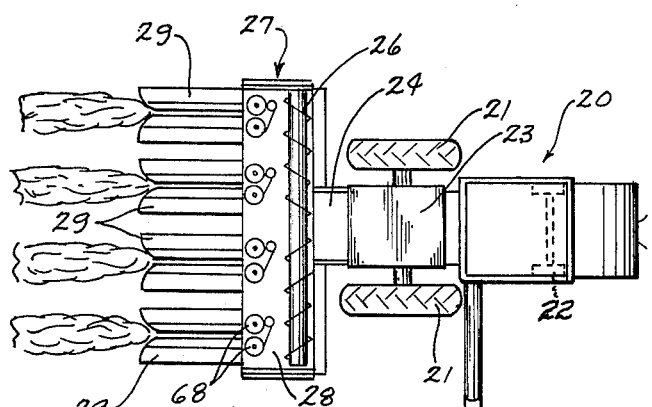
FIG. 1 is a plan view of the harvester machine illustrated as a combine with soybean harvesting row units assembled therewith.

Referring to FIG. 1, the soybean harvester machine of this invention is illustrated as comprising a self-propelled combine 20, having front traction wheels 21, and rear steering wheels 22. Forwardly of the operator's station 23 is a forwardly and downwardly inclined feeder housing 24 that has a usual crop intake (not shown) at the front end thereof open to a transversely extended feed auger 26 that forms part of a platform assembly 27 which includes a floor section 28. The auger 26 is of a conventional type and is rotated in a direction so as to move the cut crop supplied thereto inwardly from its ends for central delivery to the intake of the feeder housing 24. Supported on the platform floor 28 and projected forwardly therefrom in a transversely spaced relation are a plurality of row harvesting units 29, illustrated as being four in number.

Since the row units 29 are similar in construction, in operation and in their assembly relation with the platform assembly 27, only one thereof will be described in detail with corresponding parts being indicated by like numerals.

A row unit 29 (FIGS. 2 and 4) includes what will be referred to as a main frame 31 that is comprised of a pair of side members 32 of an angle iron construction. The side members are arranged transversely opposite each other with vertically extended legs 34 (FIG. 9) facing each other and horizontal legs 33 projected laterally outwardly in opposite directions. The side members 32 are connected together by U-shape transverse connecting or brace members 36 and 36a.

Adjustably supported on and extended forwardly from the front end of each side member 32 is a cutting disc assembly 39. Each disc assembly 39 (FIGS. 5 and 7) includes a pair of longitudinal vertically spaced support members 41 and 41a of a channel iron construction arranged with the leg sections 42 thereof projected downwardly. The rear ends of the channel members 41 are connected together by an upright face plate 43 of a rectangular shape and formed at each end thereof with a transverse slot 44. The forward end of a side member 32 (FIG. 7) carries a mating face plate 46 each end of which is formed with a bolt hole (not shown) positioned for registration with the corresponding slot 44. An adjusting bolt 47 is inserted through each bolt hole and associated slot 44 to provide for a lateral tilting adjustment of a disc assembly 39 relative to an associated side member 32.

Rotatably supported adjacent the forward end of each disc assembly 39 for rotation about an upright axis is a disc supporting shaft 48. Each shaft 48 (FIG. 5) is carried in bearings 49 and 49a located between the legs 42 of corresponding channel members 41 and 41a, respectively, with the lower end thereof projected downwardly from the lowermost channel member 41a. Secured to the projected end of a shaft 48 is a cutting disc 51 illustrated as being of a generally dish-shape with the concave side thereof faced upwardly. By lateral tilting adjustment of the disc assemblies 39 relative to their corresponding side members 32 of a main frame 31, the cutting discs 51 are adjustable to their positions shown in FIG. 5, wherein the adjacent peripheral sections of the discs are in an overlapping relation to form what will be referred to as a cutting zone 50 for the crop plants to be severed. It is seen, therefore, that the cutting disc, indicated as 51a, is in a lowermost position relative to the disc 51 in the cutting zone of the plant.

Figure 2:
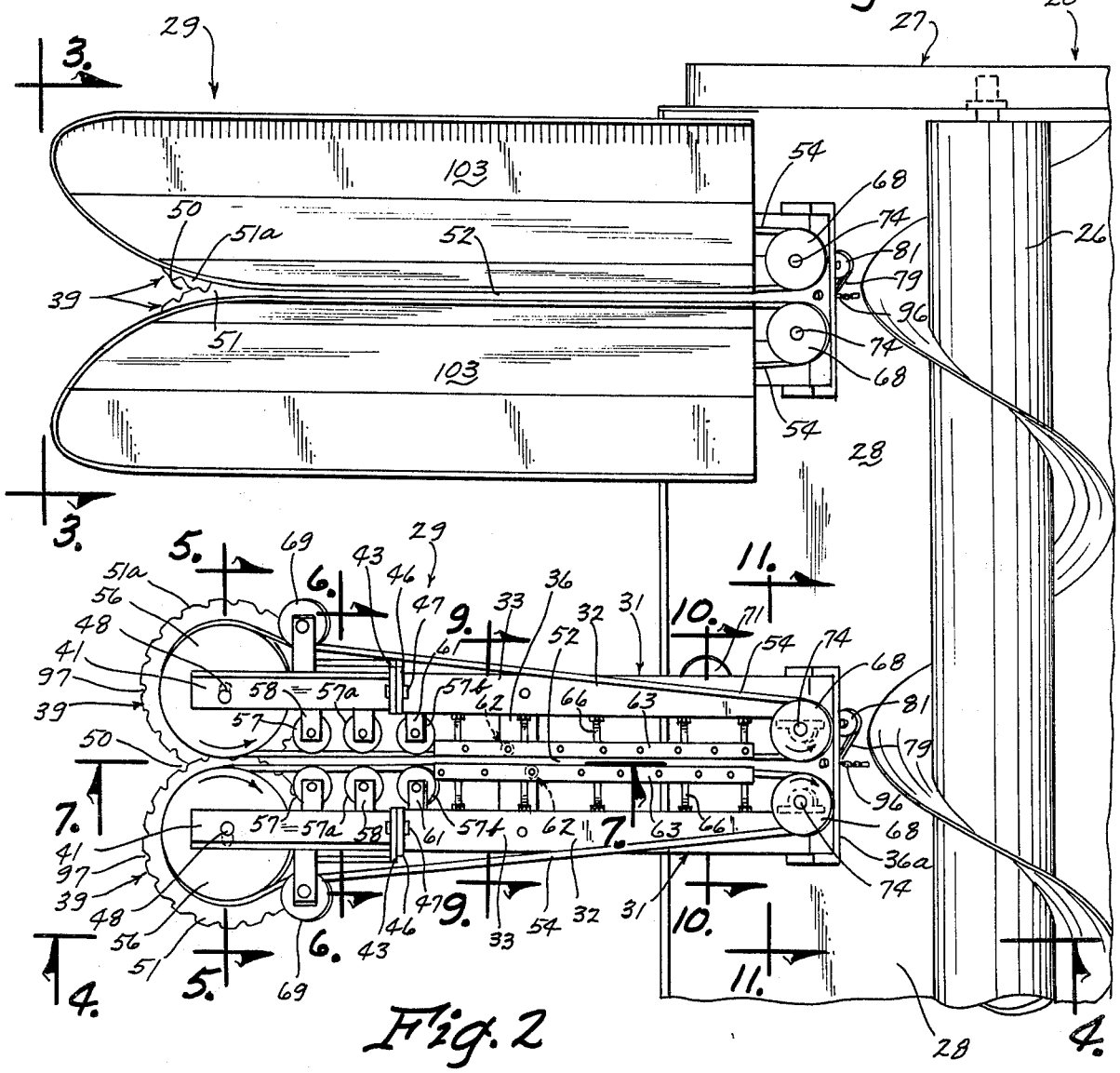
FIG. 2 is an enlarged plan view of a pair of adjacent row units with parts removed from one thereof to more clearly show its construction.

Each row unit 29 is formed with a longitudinal guideway 52 through which a severed crop plant is carried by rearwardly moving runs 53 of gathering belts 54. As best shown in FIG. 2, it is seen that a guideway 52 lies in a plane which is substantially tangent to the cutting discs 51 and 51a in the cutting zone 50. The belt runs 53 are carried by a plurality of pulleys arranged in a spaced relation longitudinally of a guideway 52. A front pulley 56 is supported on a disc shaft 48 at a position intermediate the channel members 41 and 41a of a disc assembly 39. These pulleys 56 are of a size such that the space between the adjacent peripheral sections thereof constitutes an inlet or entrance for a plant entering the guideway 52. A group of three pulleys 57, 57a and 57b are located immediately rearwardly of a front pulley 56. The pulleys 57 and 57a are carried in brackets 58 secured to the inner flanges of the channel members 41 and 41a (FIG. 6). The third pulley 57b is supported in a bracket 61 attached to the forward end of the vertical leg 33 of a side member 32 (FIG. 2).

Rearwardly of the pulley 57b is a pulley unit 62 illustrated as including five pulleys 65 (FIGS. 2 and 9) of a generally spool shape and rotatably supported between the legs of a channel frame member 63, the base section 64 of which carries a plurality of outwardly projected studs 66. The studs 66 have their free ends inserted through associated openings formed in the vertical leg 33 of a side member 32 and cooperate with adjusting nuts 67 to provide for adjustment of the pulley unit 62 transversely of the guideway 52. Pulleys 68 (FIG. 2) at the rear end of the guideway 52 function as drive pulleys for rotating the cutting discs 51 and 51a. An idle or tension pulley 69 is associated with each front pulley 56.

The drive pulleys 68 are driven from a common hydraulic motor 71 (FIGS. 2 and 10) which receives oil under pressure from a usual hydraulic pump unit (not shown) with which the combine 20 is equipped. The motor 71 is mounted from a vertical leg 33 of one of the side members 32 of a row unit 29 with the shaft 72 thereof vertically disposed and provided at its lower end with a motor pulley 73. The drive pulleys 68 (FIGS. 2 and 11) are mounted at the upper ends of shafts 74 each of which is supported in a first bearing unit 76 secured to the vertical leg 33 of a side member 32 and in a second bearing unit 77 mounted on the transverse brace 36a which connects together the side members 32. Mounted at the lower end of each shaft 74 is a pulley 78 (FIGS. 11 and 13). A drive belt 79 (FIGS. 12 and 13) is trained about the motor pulley 73, the pulley 78 and a tension pulley 81 to provide for a reversed rotation of the pulleys 78 and in turn of the drive pulleys 68, such that the discs 51 and 51a are reversely rotated inwardly toward each other, as best shown in FIGS. 2 and 13.

Corresponding to each row harvesting unit 29 is a substantially horizontal support or base member 82 (FIGS. 4 and 7) which has a rear section 83 secured to the under side of the platform floor 28 and a front section 84 projected forwardly from the floor 28. A row unit 29 is movably supported on the front section 84 for up and down pivotal movement and for movement transversely of a crop row by means including a bearing assembly 86 located within a notch or cutaway portion 87 formed in the front side of the base section 84 (FIG. 7). The transverse brace member indicated as 36 (FIGS. 7 and 9) is provided centrally of its base portion 88 with a downwardly projected shaft 89 which is rotatably supported within the bearing assembly 86. Trunions 92 on the bearing assembly 86 are rotatably carried within a pair of upright ears 93 secured to the base section 84 to opposite sides of the slot 87.

As a result of a pivotal support of a row unit 29 on the transverse axis defined by the trunions 92, the lowermost cutting disc 51a is permitted to float or ride on the ground surface 94 (FIG. 4) in a following relation with the contour of such surface. The downward pivotal movement of the discs is limited by a chain member 96 connected to and extended between the rear transverse connecting member 36a and the platform floor 28. Due to the rotational support of the shaft 89 within the bearing assembly 86, a row unit 29 is movable laterally of a plant row to provide for an automatic centering of a plant within the cutting zone 50 of the discs 51 and 51a.

Thus, referring to FIGS. 2 and 8, it is seen that the peripheral section of each cutting disc 51 and 51a is formed with circumferentially spaced notches 97. Each notch 97 has a trailing edge 98 extended substantially radially of the disc and a rearwardly and inwardly inclined leading edge 99. As best appears in FIG. 8, a notch 97 is of a substantially J-shape and of a size to receive therein the stem 101 of a crop plant.

In operation, it was found that the reception of a plant stem 101 within a notch 97 effected forces between the discs 51 and 51a relative to the plant such that a row unit 29 was moved laterally of the crop row to center the plant within the cutting zone 50, namely, between the overlapped peripheral sections of the cutting discs 51 and 51a. This movement of a row unit to automatically center itself relative to a plant to be severed is permitted by virtue of its free rotational movement within the bearing assembly 86. In this respect the notches 97 within the peripheral sections of the discs 51 and 51a coact with the plant stem 101 to guide a row unit 29 to a centered position relative to the plant stem.

Figure 3:
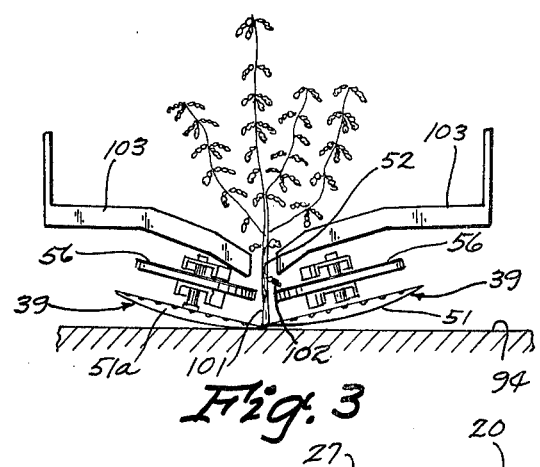
FIG. 3 is a front elevational view of a row unit as seen on line 3—3 in FIG. 2 showing a plant in a centered position with a pair of cutting discs.

It will further be seen that because of the following relation of the lowermost disc 51a on the ground surface 94 and, as best illustrated in FIG. 3, the plant stem 101 is severed at a position adjacent to the ground surface and below the lowermost pods, indicated at 102, on the stem. Since this cutting action occurs at the base of the plant, shatter losses resulting from a relative movement between the plant and the row unit, between adjacent plants or by cutting directly into pods on a plant, are substantially reduced. It is apparent also that stubble loss, generally attributed to cutting a plant stem too high, is substantially eliminated due to the low severing of the plant by the ground floating action of the lowermost disc 51a and the positive cutting cooperation between the discs 51 and 51a.

As it is being severed, the plant (FIGS. 2 and 7) is immediately engaged by the gathering belts 54 for movement in a guideway 52 and upwardly of a row unit onto the platform assembly 27 for delivery by the auger 26 to the intake of the feeder housing 24. The gathering belts are of a usual V-belt construction and by virtue of a plant being engaged and supported by the belts concurrently with its severence, the plant is retained in the position in which it was severed during its rearward travel longitudinally of the row unit 29. If during such rearward travel any of the crop to be harvested, such as soybeans, is accidently loosened from a pod, it may fall into receiving trays 103 (FIGS. 2 and 3) which are arranged to opposite sides of a longitudinal guideway 52 and function as top cover plates for a row unit. These trays would be periodically emptied during the course of a harvesting operation.

Although the invention has been described with respect to a preferred embodiment thereof, it is to be understood that it is not to be so limited since changes and modifications can be made therein which are within the full intended scope of this invention as defined by the appended claims.

I claim:

1. A soybean harvester including:
   a. a portable frame movable over a field of row planted crops including a platform assembly having a rearwardly located crop inlet means and means for delivering severed crop plants to said inlet means,
   b. a plurality of transversely spaced longitudinally extended row units projected forwardly from said platform assembly, each row unit having a fore-and-aft guideway over the full length thereof,
   c. means movably supporting each of said row units on said platform assembly for free lateral movement of the forward end thereof,
   d. a pair of endless flexible gathering means for each row unit having transversely opposite rearwardly moving runs thereof arranged at opposite sides of a guideway for engaging crop plants therebetween,
   e. a pair of rotatable cutting discs corresponding to each row unit rotatably supported adjacent the forward end of a row unit at opposite sides of a guideway for rotation about upright axes,
   f. each cutting disc having an upwardly and outwardly extended peripheral section and each pair of said cutting discs having the adjacent peripheral portions thereof in an overlapped relation within the transverse confines of a corresponding guideway, and
   h. means on each of said discs for centering a row unit relative to each crop plant in a row,
   i. with a standing crop plant in a row severed by a pair of cutting discs being engaged and carried by a pair of said gathering means to said delivery means,
   j. a plurality of horizontal base members corresponding to said row units,
   k. means supporting said base members on said platform assembly for projection forwardly therefrom,
   l. each of said means for movably supporting a row unit including a bearing assembly,
   m. means supporting each bearing assembly adjacent the front end of a base member, and
   n. a shaft projected downwardly from each row unit, intermediate the ends thereof, for rotatable support within a corresponding bearing assembly to provide for a lateral pivotal movement of a row unit about the axis of said shaft.

2. The soybean harvester according to claim 1 including:
   a. means supporting each bearing assembly on a corresponding base member for pivotal movement about an axis extended transversely of a row unit so that the lowermost one of each pair of said cutting discs constitutes a ground engaging support for the front end of a corresponding row unit whereby a crop plant is severed at substantially ground level by the coaction of each pair of discs.

* * * * *